United States Patent

[11] 3,630,678

| [72] | Inventor | Nelson C. Gardner<br>Cleveland Heights, Ohio |
|---|---|---|
| [21] | Appl. No. | 740,227 |
| [22] | Filed | June 26, 1968 |
| [45] | Patented | Dec. 28, 1971 |
| [73] | Assignee | Case Western Reserve University |

[54] DIAMOND GROWTH PROCESS
7 Claims, 4 Drawing Figs.

[52] U.S. Cl. ..................................................... 23/209.1,
23/209.9, 23/301, 252/502, 252/503, 117/46,
117/106, 117/226
[51] Int. Cl. ........................................................ C01b 31/06
[50] Field of Search............................................ 23/209.1,
301; 252/502, 503, 506, 508, 62.3 E; 148/1.5, 171,
174, 189; 117/46, 106, 226

[56] References Cited
UNITED STATES PATENTS

| 3,030,188 | 4/1962 | Eversole | 23/209.1 |
|---|---|---|---|
| 3,134,739 | 5/1964 | Cannon | 252/503 |
| 3,142,595 | 7/1964 | Wentorf | 148/171 |
| 3,148,161 | 9/1964 | Wentorf et al. | 252/502 |
| 3,268,457 | 8/1966 | Giardini et al. | 23/209.1 X |
| 3,348,984 | 10/1967 | Pammer | 148/174 |
| 3,473,974 | 10/1969 | Faust et al. | 148/174 |

*Primary Examiner*—Edward J. Meros
*Attorney*—McNenny, Farrington, Pearne and Gordon

ABSTRACT: There is provided an improved process for the growth of diamonds on seed crystals with a gaseous polycarbon atom compound which is characterized by extremely low pressures not in excess of $1 \times 10^{-2}$ (torr) and at temperatures in the range of 800° C. to 1,450° C. Interesting products including semiconductors and colored diamond crystals may be prepared by "doping" the gas with certain materials.

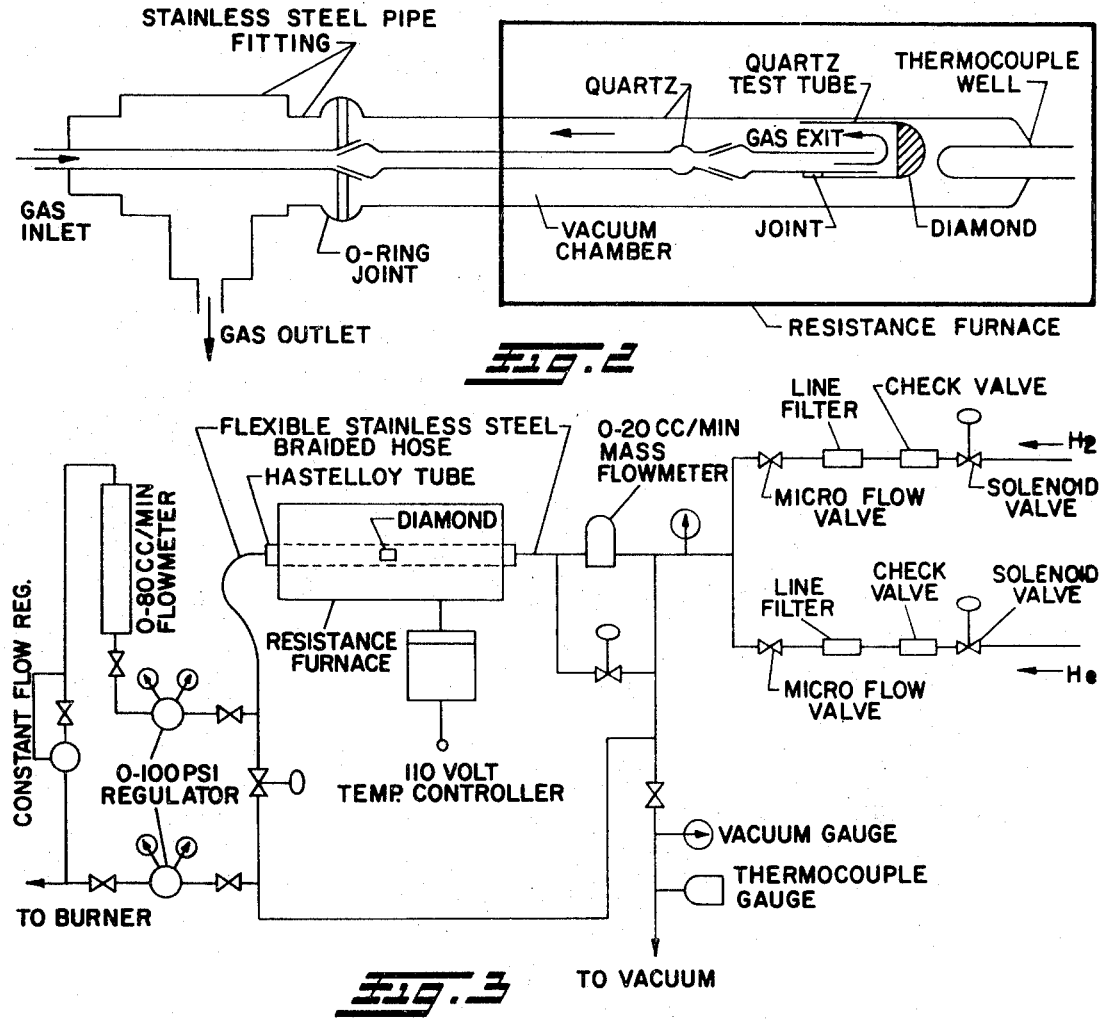

DIAMOND GROWTH PROCESS

This invention relates as indicated to an improved process for the growth of diamonds from seed crystals. It is to be distinguished from the production of industrial diamonds from carbon under conditions of extremely high temperature and pressure. This invention provides conditions for increasing the growth rate of diamonds from seed crystals to acceptable levels and for decreasing the rate of the undesired side reaction to graphite, and for growing such diamonds of such crystal structure that they have application as abrasive materials and semiconductors. The conditions which have been found to yield improvement in overall growth rate and in crystal structure are relatively low temperatures in the range of from 800° to 1,350° C., and at pressures which are very much lower than have heretofore been used.

A primary difficulty with prior so-called low-pressure processes for the growth of diamonds with polycarbon atom materials is that the growth rate of unwanted graphite is too high. This invention provides means for suppressing the growth rate of graphite and at the same time, means for producing diamond of improved crystalline quality.

The term "low pressure" insofar as it is applied to the production of diamond contemplates anything below 40,000 p.s.i. One "low-pressure" process (Hibshman, U.S. Pat. No. 3,371,996) contemplates pressures of from 1 to 2,000 atmospheres, and temperatures which are limited to 1,100° C. or less. This process is characterized by utilization of a platinum catalyst to promote the production of carbon from carbon monoxide. The present improvements contemplate very much lower pressures, preferably a hydrocarbon source for the carbon and an absence of metallic catalysts. Another process (Eversole, U.S. Pat. Nos. 3,030,187 and 3,030,188) contemplates temperatures in the range of from 600° to 1,600° C. and pressures of from 0.03 mm. Hg. to 10 atmospheres.

A special type of low-pressure carbon transport process is taught by Brinkman, U.S. Pat. No. 3,142,539 which contemplates temperatures in the range of from 1,000° to 1,800° C., and a molten metallic medium for transporting carbon to the seed crystals. Brinkman in U.S. Pat. No. 3,175,885 discloses another carbon transport process utilizing a vapor transport for carbon evaporated from pure graphite at very high temperatures, distinguished by maintaining the seeds and carbon source at different temperatures.

As an example of an extremely high-pressure process, reference may be had to U.S. Pat. No. 3,334,968 to Ishizuka who contemplates pressures of 75,000 atmospheres. Also reference may be had to the U.S. Pat. to Wentorf, No. 3,297,407, which utilizes seed crystals but extremely high pressures on the order of 75,000 atmospheres.

There are quite a few other patents which contemplate high-pressure equilibrium processes and these are exemplified by the U.S. Pat. to Darrow, No. 3,310,501; Strong No. 3,303,053; Wentorf, No. 3,142,595; Wentorf No. 3,148,161; Wentorf No. 3,181,933; Giardini, No. 3,268,457.

As indicated, the present invention is distinguished from the prior art in that it uses in all cases an oxygen-free, extremely high-purity gas source for the carbon, and most particularly is the fact that the lowest pressures ever used in diamond growth processes are hereby contemplated. These conditions provide improved crystalline quality and improved diamond growth rates in part by suppression of the unwanted reaction to form graphite. Suppression of the graphite formation has two advantages: First it permits significantly longer deposition runs, i.e. upwards of 24 hours, without interruption for cleaning graphite from the samples. Secondly, it permits shorter cleaning times; e.g. if the amount of graphite is doubled, 29 additional minutes of cleaning is required when hydrogen at 1,030° C. and 50 atm. is used for graphite removal.

The pressures contemplated are not in excess of $1 \times 10^{-2}$ (torr), and may go as low as $1 \times 10^{-8}$ (torr).

Also, the present process contemplates temperatures within the range of from 800° C. to 1,450° C. Under the conditions of the present process it has been found that diamond is not produced at appreciable rates at temperatures above 1,450° C. nor is it produced at appreciable rates at temperatures below 800° C. Preferably, the temperatures are maintained in the range of from about 1,030° to about 1,250° C. Induction heating means may be employed if desired, although satisfactory temperature control is obtained with resistance heaters.

Also, the present process contemplates very low levels of impurities, especially $H_2O$ and $O_2$ which are not well tolerated at levels on the order of 3 to 50 p.p.m. The presence of impurities in the vapor phase decreases the diamond yield, decreases the overall rate, and decreases the crystalline perfection.

Diamonds which are produced in accordance with the process of this invention may be used as conventional industrial diamonds are used; for example, they may be used in abrasive wheels or tools. Embodiments of the process of the present invention, as indicated above, also yield diamonds which are semiconducting, and of such a quality that they may be used in electrical circuits where retention of semiconducting properties at high temperatures is required, for example in diode rectifiers. Also, these diamonds so produced may be colored by the introduction of "doping" agents and have utility in the gemstone field.

Equipment which may be used in carrying out the process of this invention is shown in diagrammatic and schematic form in the annexed drawings.

FIG. 2 is a diagrammatic illustration of a quartz vacuum chamber in which the diamond growth occurs.

FIG. 3 shows equipment in diagrammatic and schematic form in which the cleaning of the seed crystals with hydrogen may be carried out.

FIG. 4 illustrates the detail of the furnace for cleaning diamonds with hydrogen.

Figure 1:
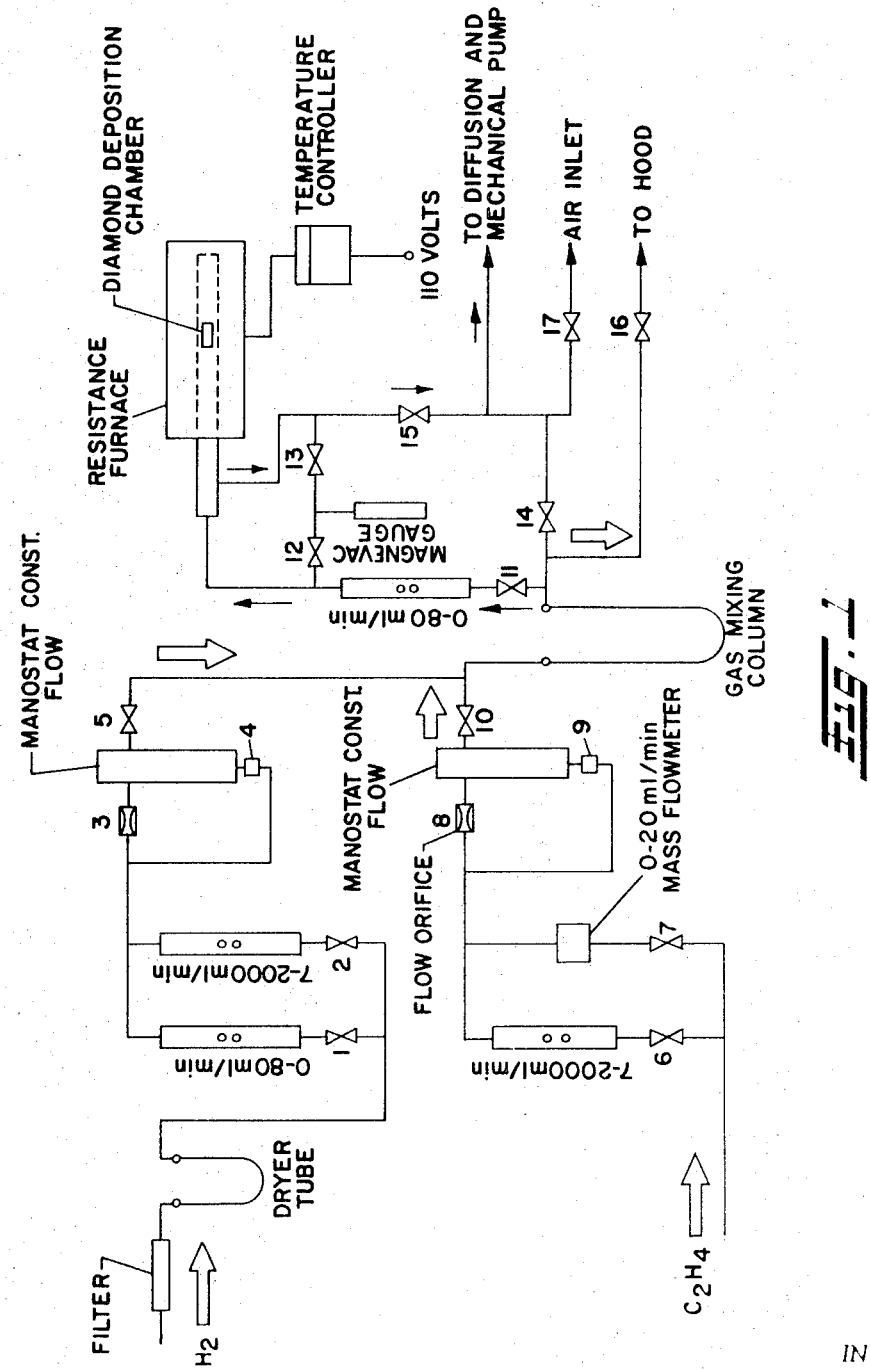
FIG. 1 shows apparatus diagrammatically and schematically in which the growth of diamond crystals from seed crystals may be performed.

Briefly stated, therefore, the present invention is in a process for growing diamond on a seed crystal, preferably diamond seed crystal, which comprises the steps of providing a seed crystal and contacting such seed crystal with a gas comprising an oxygen-free compound of carbon containing more than one atom of carbon per molecule, which gas is free of molecular oxygen and water vapor. The temperature at which this gas contacts the seed crystal is in the range of from 800° to 1,450° C., and the pressure at which this reaction is carried out is not in excess of $1 \times 10^{-2}$ (torr). (One Torr. is equal to 1 millimeter of Hg). Natural diamond seed crystals are preferred, but synthetic diamond seeds may be used. The graphite formation reaction is suppressed but not normally completely eliminated. It is therefore necessary to remove graphite selectively by reaction with hydrogen.

Referring now more particularly to FIGS. 1 and 2, the equipment useful for diamond growth in accordance with this process includes gas supplies for ethylene, for example, and hydrogen, flow and pressure controls, and a furnace. Hydrogen flow, when it is used, is controlled by a Cartesian diver manostat or a capacitance manometer flow regulator and a needle valve 5. The hydrogen can be purified with a platinum catalytic reactor or a palladium diffuser and drier tube. Thus, for a particular setting of needle valve 5, the flow will be a constant independent of upstream or downstream pressure fluctuations. The flow system for the ethylene is the same as that for hydrogen. Research grade ethylene 99.95 percent is employed. A mass flowmeter replaced the low-range flowmeter in the hydrogen line. The mass flowmeter was used for more accurate measure of the very low ethylene flow rates.

If a plurality of gases is used, for example acetylene in combination with ethylene, the gases are thoroughly mixed. Doping gases are mixed in the same way. Since a high flow of gas may be required to obtain various ethylene to acetylene ratios, a large portion of the gas is vented by means of valve 16 into a fume hood where it is burned off. A small portion of the gas is metered into the quartz diamond deposition chamber through valve 11 which reduces the pressure from approximately 3 p.s.i.g. to the operating pressure of the pressure system. After passing over the seed crystals in the diamond deposition chamber, the gas is exhausted through a diffusion pump. The operating pressure in the system is controlled by adjusting the downstream needle valve 15. Pressure in the diamond deposition chamber is measured by electronic means.

The diamond deposition chamber is best illustrated in FIG. 2, and shows its disposition in the resistance furnace and the fact that the component parts within the furnace are formed from quartz. The temperature is measured by means of a thermocouple inserted in a thermocouple well in close proximity to the sample chamber.

As shown in FIG. 2, diamond seed crystal powder is placed in the bottom of the quartz test tube so that the gas flows along a path through a quartz joint, over the diamond seed crystals, and out the top of the test tube. The test tube and the quartz gas inlet tube are joined together near the lip of the test tube to make it easier to slide the assembly into the vacuum chamber. It is preferred that the gas not flow through the diamond powder because it has been found that this causes too large a pressure drop across the seed crystal bed. Such a pressure drop may cause diamond powder to be blown out of the sample chamber.

In order to grow high-quality crystals at useful yields and growth rates, it is necessary that the entire deposition system is vacuum tight. Great care must be exercised to eliminate all leaks which permit entrance of air ($N_2$, $O_2$, $H_2O$, and $CO_2$) into the system. The components shown in the drawing are ultra-high-vacuum components.

The temperature of the diamond seed crystals is maintained at a constant level by a 24-inch-long electrical resistance furnace. The temperature profile along the length of the furnace is adjustable by means of electrical shunt taps on the back of the furnace, not shown. By adjusting the shunts across these taps, the temperature profile was made flat to within 5 inches of the ends of the resistance furnace. This flat temperature profile allows the temperature of the gas to approach equilibrium before it reaches the diamond seed crystal. A proportional band power controller is conveniently utilized to maintain the temperature within plus or minus 0.2° C. of the set point.

Referring now to FIG. 3, there is shown a flow diagram for an apparatus for cleaning diamond seed crystals with hydrogen under pressure, e.g. 50 atmospheres. Graphite is selectively removed from the diamond seed crystals by reaction with hydrogen at pressures on the order of 50 atmospheres, and temperatures on the order of 1,000° C. The cleaning reaction is just the reverse of the ethylene reaction used for depositing diamond. It has been found that the rate of reaction of diamond with hydrogen at these pressures and temperatures is about 3 orders of magnitude less than the rate of reaction for hydrogen with graphite under the same conditions. Thus, graphite may be removed from diamond with very little loss of diamond. The reaction time for cleaning a supply of diamond seed crystals is about 7 hours. Under these conditions, it has been found that 99.9 percent of the graphite is removed while the weight of the diamond mass will decrease by less than 0.3 percent.

In carrying out the cleaning operation, hydrogen is contacted with the diamond seed crystals contained within a "Hastelloy" tube 36 inches long, 2 inches in diameter and having an 11/16-inch hole bored through the center. Hose connections are made to each end of the tube, and various flow control regulators and pressure gauges included in the line as shown in the diagram.

FIG. 4 shows in greater detail the furnace for cleaning diamonds with hydrogen under pressure.

Referring to FIG. 4, there is provided a bored steel tube 20 fitted with end bushings 22 and 24, and having threaded nipples 26 and 28 extending therefrom. Nipples 26 and 28 are attached to receive entering gas tube 30 and outlet gas tube 32. Thus, the bore 34 is closed except for the gas inlet and gas exit means. Disposed within the bore 34 is an adapter 36 frictionally retained within the bore 34 by means of a high-temperature-resistant O-ring 38, and adapted to receive the diamond sample assembly composed of a glass joint member 40 and test tube 42 secured together by sealing the tube 40 to the test tube 42 at point 44. The diamond sample 46 is disposed in the bottom of the tube. Gas entering through inlet tube 30 passes through adapter tube 36 and joint 40, flows across the diamond sample 46 and exits around the lip of the tube 42, and then passes out through the outlet gas line 32. An adapter 48 is provided to allow removal of the gas and also to provide for the introduction of a thermocouple 50 to measure the temperature of the system.

The most essential part of the cleaning apparatus is the reaction tube which must withstand pressures of at least 100 atmospheres of hydrogen at temperatures up to about 1,100° C.

In general, the procedure for cleaning the diamond powder is as follows: The diamond sample is placed in the sample chamber or tube 42, and the sample tube 40–42 assembled with the adapter 36 and inserted in the reaction tube 20. A stainless steel tube is connected to the inlet tube 30 and a stainless steel hose connected to the exit 52. The apparatus is evacuated to less than 10 microns through the vacuum line indicated in FIG. 3. The apparatus is then pressurized with 50 atmospheres of hydrogen and the temperature in the reaction tube 20 elevated to 1,032° C. where it is maintained for a period of 7 hours. The furnace is then cooled and the hydrogen vented. A vacuum is again pulled on the system and the system filled with helium to atmospheric pressure. The diamond sample is then removed from the tube.

The diamond seed crystal samples which are used in this invention are in the form of natural diamond powder having a particle size of 0 to 1 micron or from 1 to 5 microns. Industrial diamond such as this material is contains metallic impurities along with a small amount of graphite. Most of the metallic impurities can be removed by pretreatment of the diamond powder with aqua regia. Certain impurities such as tungsten oxides can be removed only with hydrofluoric acid.

A typical procedure for initial or precleaning of the diamond powder is to add aqua regia to the diamond powder at room temperature and maintain the diamond powder submerged therein for a period of 24 hours after which time the sample is rinsed. The diamond powder is then treated with concentrated hydrofluoric acid in a suitable container for an additional 24-hour period at room temperature. The acid is decanted and the powder thoroughly rinsed with distilled water. The powder is then transferred to a glass test tube and dried by heating to a temperature not in excess of 100° C. At this point, the diamond powder can be submitted to the high-pressure hydrogen cleaning process.

In all the deposition runs the deposit is identified as new diamond by the following series of experiments: chemical analysis for carbon; precision density measurements; X-ray and electron diffraction; chemical etching with $H_2SO_4$-$HNO_3$ solutions; etching with aqua regia; microwave absorption; and electron spin resonance. In all runs the results are consistent only with the deposit being new crystalline diamond of high crystalline perfection and quality. The results show that the observed diamond growth is of a high quality with few voids and defects in the diamond lattice. No evidence of any amorphous or graphitic carbon is found. Diamonds of high perfection are required in order to find application as semiconductors and as gemstones.

It becomes convenient at this point to illustrate the present invention by giving specific examples. These examples are for illustrative purposes and are not intended to limit the invention.

EXAMPLE 1

Diamond seed crystals are submerged in aqua regia at 25° C. for a period of 24 hours, rinsed, and then submerged in hydrofluoric acid at 25° C. for a period of 24 hours and again rinsed and dried. The sample is then submitted to treatment with hydrogen gas at 50 atmospheres pressure and 1,033° C. for a period of 7 hours to clean the diamond seed crystals.

In order to obtain oxygen-free and moisture-free ethylene gas, the ethylene gas of the highest purity commercially available is used.

The purified, oxygen-free and moisture-free ethylene is then continuously passed over the diamond seed crystals in an apparatus such as shown in FIGS. 1 and 2 for a period of 12 hours. The pressure within the vessel containing the diamond seed crystals is maintained at $1 \times 10^{-3}$ (torr) by needle valve 11 and temperature as recorded by the thermocouple 50 is 1,100° C.

No graphite is deposited on the quartz walls of the chamber and very little on the diamond seed crystals. Visual observation of the darkening of the seed crystals permits one to detect graphite in amounts as low as 0.3 percent.

Following this procedure, graphite production is very low and increases in weight per cycle in the range of from 0.1 -5 percent by weight are obtained. These determinations on weight increase are made after the diamonds have been submitted again to a cleaning treatment with hydrogen under the same conditions that the seed crystals were cleaned immediately prior to treatment with hydrocarbon gas. The quality of diamond so deposited is highly satisfactory.

When the pressure is increased to $5 \times 10^{-2}$ (torr), the other conditions remaining the same, no diamond growth is observed with ethylene gas.

Other gases may be substituted for ethylene with satisfactory results. Such materials include acetylene, propylene, butene, butadiene-1,3benzene, dichloro ethylene, tetrachloro ethylene, styrene, alpha chlorostyrene, cyclohexane, cyclohexene, cyclopropane, cyanogen $(CN)_2$, etc. Oxygen-containing organics are to be avoided. It has been found advantageous to blend with such polycarbon atoms materials as here mentioned, an oxygen-free inert gas such as helium, xenon, or the like. From 1 percent to 50 percent by volume of the inert gas may be used. Its effect appears to be the inhibition of formation of amorphous carbon or graphite on the seed crystal and hence the enhancement of the growth of the diamond form of carbon.

Cyanogen appears to deposit diamond very well, not only under the conditions of the lower pressures of $10^{-8}$ (torr) to $10^{-2}$ (torr), but also at pressures up to as high as 5 (torr) within the temperature range stated. The other polycarbon atom materials fail to deposit diamond at useful rates at pressures above $1 \times 10^{-2}$ (torr).

Mixture of polycarbon atom gases may be used to advantage. For example, a mixture of acetylene and ethylene is useful. The acetylene aids, it is believed, in removing surface hydrogen to better prepare the surface for diamond deposition. Thus, more highly unsaturated materials may be used with saturated or less highly saturated materials to improve growth. Molar ratios in the range of 1:100 to 100:1 may be used to advantage.

Other gas phase compositions may also be used. For example, mole ratios of ethylene to hydrogen ranging from 100 to 0.01 reduce graphite formation and enhance yield of diamond. However, it is observed at the lower ratios, e.g. 0.01 the rate of diamond formation becomes negligible and below this value it even becomes negative. Helium, or other inert gases, may be substituted for part or all of the hydrogen. However, inferior growth rates and sometimes mass decreases are observed when oxygen-containing inert gases are used. This is believed to be caused by the presence of trace amounts of oxygen in the inert gas.

EXAMPLE 2

It is not necessary that hydrogen at 50 atmospheres be used to clean-off the unwanted graphite from the diamond seed crystals. An oxygen-containing gas at subatmospheric pressure can be used. High overall rates of diamond growth are obtained in a single apparatus by alternately depositing carbon and then cleaning the surface with $O_2$, followed by $H_2$ reduction of the surface at low pressures. This process is not practical if large amounts of graphite are present, i.e. if the carbon deposition done at too high a pressure. It is useful where the amount of unwanted graphite is low. The initial cleaning procedure for the diamond seed crystals is the same as that stated for example 1.

In this example, the purified cyanogen, $(CN)_2$, gas is passed continuously over the diamond seed crystals in an apparatus such as shown in FIG. 2 for 1 hour at 1,300° C. and a pressure of $10^{-3}$ (torr). Thereafter, the flow of cyanogen gas is discontinued, and oxygen gas is passed over the diamond seed crystals for a period of 0.5 hour at 1,300° C. and $10^{-2}$ (torr) for the purpose of preferentially removing graphite. The flow of oxygen gas is discontinued and hydrogen gas is then passed over the diamond seed crystals for 0.5 hour at 1,300° C. and $10^{-2}$ (torr).

The apparatus is then evacuated and the preceding steps of passing the cyanogen gas over the seed crystals, removal of graphite with oxygen and flushing with hydrogen gas repeated until the desired mass increase in weight is obtained.

The foregoing example illustrates a process which is advantageous in respect of the cleaning procedure because the cycles can be completed repeatedly, and a single piece of equipment may be used instead of necessitating transferral to a separate hydrogen-cleaning apparatus such as shown in FIGS. 3 and 4.

Another method which may be used to clean the diamond surface is by the use of electron or ion bombardment. This process will clean the surface of the diamond, removing the graphite which has nucleated on the diamond surface. The static pressures should be very low during this type of cleaning, e.g., on the order of $10^{-8}$ (torr) to $10^{-2}$ (torr).

EXAMPLE 3

This example illustrates the manner of using doping materials as components in the gas mixture for contacting with the seed crystals in the extremely low pressures of the present invention.

The procedure is identical with the procedure of example 1 with the exception that a gas mixture of 0.1 mole percent of $BCl_3$ in the ethylene is passed over the seed crystals at a temperature of 1,050° C. and a pressure of $1 \times 10^{-3}$ (torr) for a period of 12.5 hours. The diamond crystals are then cleaned with hydrogen at a temperature of 1,033° C., a pressure of 50 atmospheres, for a period of 7 hours, in an apparatus such as shown in FIGS. 3 and 4 to remove any graphite formed during the process.

Instead of boron trichloride, other boron-containing compounds may be used, for example the boranes including $B_2H_6$, $B_4H_{10}$, $B_5H_9$, $B_6H_{10}$, $B_{10}H_{14}$, etc. Also, the halogenated boranes such as $B_2H_5Br$, $B_2H_5Cl$, $B_2H_5I$, as well as the completely halogenated compounds such as $BBr_3$, $BBR_2I$, $BBrI_2$ and $BI_3$.

EXAMPLE 4

This example illustrates the manner of using aluminum as a doping agent.

The initial cleaning of the diamond seed crystals is the same as given in example 1. To introduce aluminum chloride, an inert gas, i.e. helium, is passed over solid aluminum chloride held at approximately 150° C. The pressure of the inert gas is 1 atmosphere or less. To prepare the ethylene gas to include the doping agent, aluminum in the form of aluminum chloride, the ethylene is mixed with the inert gas so that the total concentration of the aluminum chloride in the ethylene is equal to 0.1 mole percent. This mixture of gases is passed over the diamond seed crystals 1 hour held at a temperature of 1,100° C. The gas pressure is the same as in example 1.

The total exposure time is 24 hours. After exposure to the doped ethylene gas, the diamond crystals are found to have increased in weight and are submitted to a cleaning operation such as described in example 1. Thereafter, the crystals are immersed in aqua regia at 25° C. for a period of 24 hours to yield a final product in which aluminum is included in the crystal lattice.

Alternate sources of aluminum may be used. These include among others triethyl aluminum, trimethyl aluminum, aluminum ethoxide, aluminum propoxide, aluminum isopropoxide, aluminum butoxide, aluminum phenoxide, aluminum tribromide, and aluminum triiodide. Also an electrically heated aluminum wire may be used. The wire is heated for 2.0- to 200-millisecond intervals by means of a capacitance discharge.

EXAMPLE 5

This example illustrates the use of mixtures of carbon containing gas species. To facilitate removal of hydrogen from the diamond surface so that more carbon containing gas species can deposit carbon on the surface, mixtures of gases listed in example 1 may be employed.

The procedure is identical with example 3 except that a gas mixture of 1.0 mole percent in ethylene is passed over the seed crystals at 1,000° C. and a pressure of $5 \times 10^{-4}$ (torr) for 4 hours. The diamond crystals are then cleaned with hydrogen at a temperature of 1,033° C., a pressure of 50 atmospheres, for a period of 7 hours in an apparatus shown in FIGS. 3 and 4 to remove any graphite formed in the process.

Instead of acetylene-ethylene gas mixtures, ethylene-methane gas mixtures are particularly useful. Other mixtures that may be used include acetylene-methane, ethylene-cyclopropane, ethylene-tetrachloroethylene, etc. Molar ratios in the range of 1:1,000 to 1,000:1 may be used to advantage.

Example 6

The present invention can be used as a technique for forming a matrix of tightly bonded diamond particles. The cleaning of the seed crystals and the gas purification are performed as in example 1. The diamond seed crystals are compacted together in the deposition chamber so there are many points of contact between the crystals.

If desired, the diamond powder can be pressure compacted into the form of a disk or sphere or other shape. The deposition and the cleaning after deposition proceeds as in example 1. The diamond seed crystals, after the removal of any graphite, are in the form of a diamond matrix with strong bonds between the previously unattached particles. The bonding between the particles is strong. For example, when it was attempted to break one of the matrices by pressing on it with a common pair of laboratory tweezers, the end of the steel tweezers snapped off and the diamond matrix remained unbroken.

The matrix-forming process appears to be a joining together of the original separate diamond seed crystals by a bridge of strong new diamond at or near the points of contact in the original compact. The diamond matrices may have utility in abrasive applications. For example, the diamond matrix can be impregnated with a carbide-forming metal to form tough, bonded composite diamond grinding wheels.

Seed crystals other than diamond can be used. For example, diamondlike deposits are observed when silicon carbide crystals are used as the seed crystals rather than diamond. The advantage of using seed crystals other than diamond is their lower cost. Ethylene gas, for example, may be passed over silicon carbide seed crystals under the conditions set forth in example 1.

It has been found that oxygen and $H_2O$ impurities in the gases drastically reduce the formation rate of diamond and accordingly great care must be exercised to avoid the presence of either oxygen or $H_2O$ in the gases in the presence of the seed crystals. Moisture which, under the conditions of the process provides oxygen in the system, is to be avoided. Best results in removing moisture are obtained through the use of acetone/dry ice or n-pentane/liquid nitrogen cold traps.

Valuable products, particularly semiconductor products, may be prepared by "doping" the inlet gas with controlled amounts (from 0.0005 percent by volume to 1 percent by volume) of materials which will enter into the diamond lattice and create either color or semiconducting properties, or both, upon the final product. For example, boron hydride, $B_2H_6$, may be used to produce semiconductors, and the procedure is quite simple, simply by introducing boron hydride into the gas stream in an amount within the range above stated, for example 0.001 percent by volume. There may be substituted for the boron hydride, boron trichloride and the other higher molecular weight boranes, e.g. $B_4H_{10}$. Other materials useful in this connection include compounds of aluminum, phosphorus, and lithium, or combinations thereof. The aluminum compounds, lithium compounds, and phosphorus compounds are preferably in the form of organometallic derivatives such as trimethyl aluminum, triethyl aluminum, lithium methyl, lithium ethyl, etc.

All of the products of the present invention may, of course, be used in the production of abrasive tools or wheels by procedures which are well known.

Instead of diamond seed crystals, other seed nucleii may be used. These include silicon carbide and boron nitride (cubic form) and are used in the same manner as the diamond seed crystals. Natural diamond seed crystals or synthetic diamond seed crystals may be used effectively although the natural diamond seed crystals are preferred.

It has also been noted that growth of diamond seed crystals by either or both of two mechanisms occurs. First, there is growth by deposition of carbon which is or becomes of the diamond form. Second, adjacent crystals appear to grow together under the conditions of this invention.

It is not necessary that the gas and seeds be at the same temperature. When using induction heating, it is particularly easy to have the seed crystals considerably warmer than the gaseous source of carbon flowing over the seeds. This can be useful in minimizing graphite deposition on the quartz parts of the deposition chamber, and minimizing vaporization of unwanted impurities from the walls of the apparatus.

An alternate method of obtaining a flux of carbon-containing molecules impinging on the surface of the seed crystals, e.g. diamond seed crystals, is by the use of a molecular beam. This technique requires the use of extremely low static pressures, e.g., on the order of $10^{-8}$ (torr). Another related method which may be employed is the use of a mass spectrometer which will provide a beam of charged carbon containing species for impingement on the seed crystals. These species may be fragments of hydrocarbon molecules.

The following table I sets forth additional examples of reactant gases and conditions for growth of diamonds from diamond seed crystals in accordance with which the present invention may be practiced. The results are similar to those obtained in example 1.

TABLE I

| Example Number | Carbon source material | Molar ratio | Temp. (° C.) | Pressure (torr) | Cycle time (hrs.) | Cleaning process |
|---|---|---|---|---|---|---|
| 7 | $(CN)_2$ | | 1,050 | $1 \times 10^{-3}$ | 12 | $H_2$. |
| 8 | $(CN)_2$ | | 1,300 | $1 \times 10^{-3}$ | 12 | {Low pressure $O_2$. {Low pressure $H_2$. |
| 9 | $(CN)_2$ | | 1,300 | $1 \times 10^{-3}$ | $^1$ 12 | {Low pressure $O_2$. {Low pressure $H_2$. |
| 10 | $C_2H_4$ plus .1% $B_2H_6$ | 1,000 to 1 | 1,050 | $1 \times 10^{-3}$ | 12 | $H_2$. |
| 11 | $C_2H_4$ plus .1% $AlCl_3$ | | 1,100 | $1 \times 10^{-3}$ | 12 | $H_2$. |
| 12 | $C_2H_4$ plus $C_2H_2$ | 100 to 1 | 1,000 | $5 \times 10^{-4}$ | 4 | $H_2$. |
| 13 | $C_2H_4$ plus $CH_4$ | 1 to 10 | 1,100 | $1 \times 10^{-3}$ | 12 | $H_2$. |

$^1$ 4 cycles.

What is claimed is:

1. A process for growing diamond which comprises contacting a seed crystal of diamond, silicon carbide or boron nitride with a molecular oxygen-free gas comprising an oxygen-free compound of carbon containing a plurality of carbon atoms per molecule at a temperature in the range of from 800° to 1,450° C. and a pressure not in excess of $1\times10^{-2}$ torr.

2. A process in accordance with claim 1 in which the temperature is in the range of 1,030° to 1,250° C.

3. A process in accordance with claim 1 in which the pressure is in the range of $1\times10^{-6}$ to $1\times10^{-3}$ (torr).

4. A process in accordance with claim 1 in which the gas consists essentially of a compound of carbon containing a plurality of carbon atoms per molecule and hydrogen.

5. A process in accordance with claim 1 in which the compound of carbon is ethylene.

6. A process in accordance with claim 1 in which the gas consists essentially of a compound of carbon containing a plurality of carbon atoms per molecule and a doping agent.

7. A process in accordance with claim 6 in which the doping agent is an organoaluminum compound.

* * * * *

UNITED STATES PATENT OFFICE
CERTIFICATE OF CORRECTION

Patent No. 3,630,678           Dated December 28, 1971

Inventor(s) Nelson C. Gardner

It is certified that error appears in the above-identified patent and that said Letters Patent are hereby corrected as shown below:

Column 6, Line 35, "$10^{-2}$" should read -- $10^2$ --.

Column 7, Line 22, after "percent" insert -- acetylene --.

Signed and sealed this 4th day of July 1972.

(SEAL)
Attest:

EDWARD M. FLETCHER, JR.
Attesting Officer

ROBERT GOTTSCHALK
Commissioner of Patents